(12) United States Patent
Walton et al.

(10) Patent No.: US 8,265,208 B2
(45) Date of Patent: Sep. 11, 2012

(54) RECEIVER FOR WIRELESS COMMUNICATION NETWORK WITH EXTENDED RANGE

(75) Inventors: J. Rodney Walton, Carlisle, MA (US); Mark S. Wallace, Bedford, MA (US)

(73) Assignee: Qualcomm Incorporated, San Diego, CA (US)

( * ) Notice: Subject to any disclaimer, the term of this patent is extended or adjusted under 35 U.S.C. 154(b) by 82 days.

(21) Appl. No.: 12/271,834

(22) Filed: Nov. 14, 2008

(65) Prior Publication Data

US 2009/0122927 A1    May 14, 2009

Related U.S. Application Data

(62) Division of application No. 11/224,916, filed on Sep. 12, 2005, now Pat. No. 7,684,473.

(60) Provisional application No. 60/686,645, filed on Jun. 1, 2005, provisional application No. 60/691,706, filed on Jun. 16, 2005.

(51) Int. Cl.
*H03D 1/00* (2006.01)

(52) U.S. Cl. .......................... 375/343; 375/344; 375/355

(58) Field of Classification Search .................. 375/343, 375/344, 355
See application file for complete search history.

(56) References Cited

U.S. PATENT DOCUMENTS

| | | | |
|---|---|---|---|
| 5,729,570 A * | 3/1998 | Magill ........................... 375/149 |
| 6,205,188 B1 | 3/2001 | Stott et al. |
| 6,456,644 B1 | 9/2002 | Ramberg et al. |
| 6,618,452 B1 * | 9/2003 | Huber et al. ................... 375/343 |
| 6,628,730 B1 | 9/2003 | Stott et al. |
| 6,763,059 B2 | 7/2004 | Suzuki et al. |
| 6,765,969 B1 | 7/2004 | Vook et al. |
| 6,882,682 B1 | 4/2005 | Tanaka |
| 7,268,286 B2 * | 9/2007 | Carpenter ....................... 84/454 |
| 7,409,057 B1 * | 8/2008 | Chen et al. ............... 379/406.08 |
| 7,436,878 B1 * | 10/2008 | Harris et al. .................... 375/142 |

(Continued)

FOREIGN PATENT DOCUMENTS

CN    1375132 A    10/2002

(Continued)

OTHER PUBLICATIONS

International Search Report—PCT/US06/020541—International Search Authority—ISA/US—Alexandria, Virginia—Nov. 19, 2007.

(Continued)

*Primary Examiner* — Shuwang Liu
*Assistant Examiner* — Nader Bolourchi
(74) *Attorney, Agent, or Firm* — Qualcomm Patent Group; James H. Yancey, Jr.

(57) ABSTRACT

Techniques for detecting and demodulating a signal/transmission are described. Signal detection is performed in multiple stages using different types of signal processing, e.g., using time-domain correlation for a first stage, frequency-domain processing for a second stage, and time-domain processing for a third stage. For the first stage, products of symbols are generated for at least two different delays, correlation between the products for each delay and known values is performed, and correlation results for all delays are combined and used to declare the presence of a signal. For demodulation, the timing of input samples is adjusted to obtain timing-adjusted samples. A frequency offset is estimated and removed from the timing-adjusted samples to obtain frequency-corrected samples, which are processed with a channel estimate to obtain detected symbols. The phases of the detected symbols are corrected to obtain phase-corrected symbols, which are demodulated, deinterleaved, and decoded.

9 Claims, 10 Drawing Sheets

U.S. PATENT DOCUMENTS

| | | | |
|---|---|---|---|
| 7,602,834 B1 * | 10/2009 | Giallorenzi et al. | 375/130 |
| 7,684,467 B2 * | 3/2010 | Li et al. | 375/147 |
| 2003/0072354 A1 | 4/2003 | Chang et al. | |
| 2004/0005018 A1 * | 1/2004 | Zhu et al. | 375/340 |
| 2004/0085946 A1 * | 5/2004 | Morita et al. | 370/342 |
| 2004/0264607 A1 | 12/2004 | Lewis | |
| 2006/0045001 A1 * | 3/2006 | Jalali | 370/208 |
| 2006/0239233 A1 * | 10/2006 | Hanada et al. | 370/335 |
| 2007/0211790 A1 * | 9/2007 | Agrawal et al. | 375/147 |
| 2011/0102258 A1 * | 5/2011 | Underbrink et al. | 342/357.47 |

FOREIGN PATENT DOCUMENTS

| | | |
|---|---|---|
| EP | 0653858 | 5/1995 |
| EP | 1096693 A2 | 5/2001 |
| RU | 2242088 | 12/2004 |
| SU | 1683181 | 10/1991 |
| WO | 2004086710 | 10/2004 |
| WO | WO2004114537 A1 | 12/2004 |

OTHER PUBLICATIONS

Written Opinion—PCT/US06/020541—International Search Authority—ISA/US—Alexandria, Virginia—Nov. 19, 2007.

Supplementary European Search Report—EP06760450, Search Authority—Munich Patent Office, Jun. 14, 2011.

Van Nee, Richard et al., OFDM for Wireless Multimedia Communication. London: Artech House, 2000, Chapter 4 "Synchronization," 4.6, "Synchronization Using Special Training Symbols," pp. 86-88; Chapter 10 Applications of OFDM, 10.5.4 "Training," pp. 246-247.

* cited by examiner

RECEIVER FOR WIRELESS COMMUNICATION NETWORK WITH EXTENDED RANGE

PRIORITY CLAIM

This application is a divisional application of, and claims the benefit of priority from, U.S. patent application Ser. No. 11/224,916, filed Sep. 12, 2005 and entitled "Receiver for Wireless Communication Network with Extended Range," now U.S. Pat. No. 7,684,473 issued Mar. 23, 2010, which claims the benefit of priority from U.S. Provisional Patent Application Ser. No. 60/686,645, filed Jun. 1, 2005, and from U.S. Provisional Patent Application Ser. No. 60/691,706, filed Jun. 16, 2005, all of which are assigned to the assignee of this application and are fully incorporated herein by reference for all purposes.

FIELD

The present disclosure relates generally to communication, and more specifically to a receiver for wireless communication.

BACKGROUND

Wireless communication networks are widely deployed to provide various communication services such as data, voice, video, and so on. These networks include wireless wide area networks (WWANs) that provide communication coverage for large geographic areas (e.g., cities), wireless local area networks (WLANs) that provide communication coverage for medium-size geographic areas (e.g., buildings and campuses), and wireless personal area networks (WPANs) that provide communication coverage for small geographic areas (e.g., homes). A wireless network typically includes one or more access points (or base stations) that support communication for one or more user terminals (or wireless devices).

IEEE 802.11 is a family of standards developed by The Institute of Electrical and Electronics Engineers (IEEE) for WLANs. These standards specify an over-the-air interface between an access point and a user terminal or between two user terminals. IEEE Std 802.11, 1999 Edition (or simply, "802.11"), which is entitled "Part 11: Wireless LAN Medium Access Control (MAC) and Physical Layer (PHY) Specifications," supports data rates of 1 and 2 mega bits/second (Mbps) in the 2.4 giga Hertz (GHz) frequency band using either frequency hopping spread spectrum (FHSS) or direct sequence spread spectrum (DSSS). IEEE Std 802.11a-1999 (or simply, "802.11a") is a supplement to 802.11, uses orthogonal frequency division multiplexing (OFDM) instead of FHSS or DSSS, and supports data rates of up to 54 Mbps in the 5 GHz frequency band. IEEE Std 802.11b-1999 (or simply, "802.11b") is another supplement to 802.11 and uses DSSS to support data rates of up to 11 Mbps. IEEE Std 802.11g-2003 (or simply, "802.11g") is yet another supplement to 802.11, uses DSSS and OFDM, and supports data rates of up to 54 Mbps in the 2.4 GHz band. These various standards are well known in the art and publicly available.

The lowest data rate supported by 802.11, 802.11a, 802.11b and 802.11g is 1 Mbps. For 802.11b and 802.11g (or simply, "802.11b/g"), a specific DSSS scheme and a specific modulation scheme are used to send a transmission at the lowest data rate of 1 Mbps. The DSSS and modulation schemes for 1 Mbps require a certain minimum signal-to-noise-and-interference ratio (SNR) for reliable reception of the transmission. The range of the transmission is then determined by the geographic area within which a receiving station can achieve the required SNR or better. In certain instances, it is desirable to send a transmission with a range that is greater than the range for the lowest data rate supported by 802.11b/g.

There is therefore a need in the art for a wireless communication network and a station capable of operating with an extended coverage range.

SUMMARY

Techniques for detecting and demodulating a signal/transmission in poor channel conditions (e.g., a low SNR) are described herein. In an aspect, signal detection is performed in multiple stages using different types of signal processing to achieve good detection performance. In an embodiment, signal detection is performed using time-domain correlation for a first stage, frequency-domain processing for a second stage, and time-domain processing for a third stage. The signal detection for each stage may further be performed based on an adaptive threshold that is derived based on the received energy for a window of symbols, so that detection performance is less sensitive to received signal level. The presence of a signal may be declared based on the outputs of all three stages.

In an aspect of the first stage, input samples at a receiving station may be despread with a code sequence to generate despread symbols. Products of despread symbols are then generated for at least two delays, e.g., 1-symbol and 2-symbol delays. Correlation between the products for each delay and known values for that delay is performed. The correlation results for all the delays are then combined, e.g., non-coherently or coherently for multiple hypothesized phases. The presence of a signal and the timing of the signal may be determined based on the combined correlation results.

In another aspect, demodulation is performed in a manner to achieve good performance under poor channel conditions. In an embodiment, the timing of the input samples is adjusted (e.g., with a polyphase filter) to obtain timing-adjusted samples. A frequency offset is estimated and removed from the timing-adjusted samples to obtain frequency-corrected samples, which are processed with a channel estimate (e.g., using a rake receiver) to obtain detected symbols. The phases of the detected symbols are corrected to obtain phase-corrected symbols. Demodulation is then performed on the phase-corrected symbols to obtain demodulated symbols, which are deinterleaved and decoded to obtain decoded data.

The signal processing for each detection stage and for demodulation is described in detail below. Various aspects and embodiments of the invention are also described below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
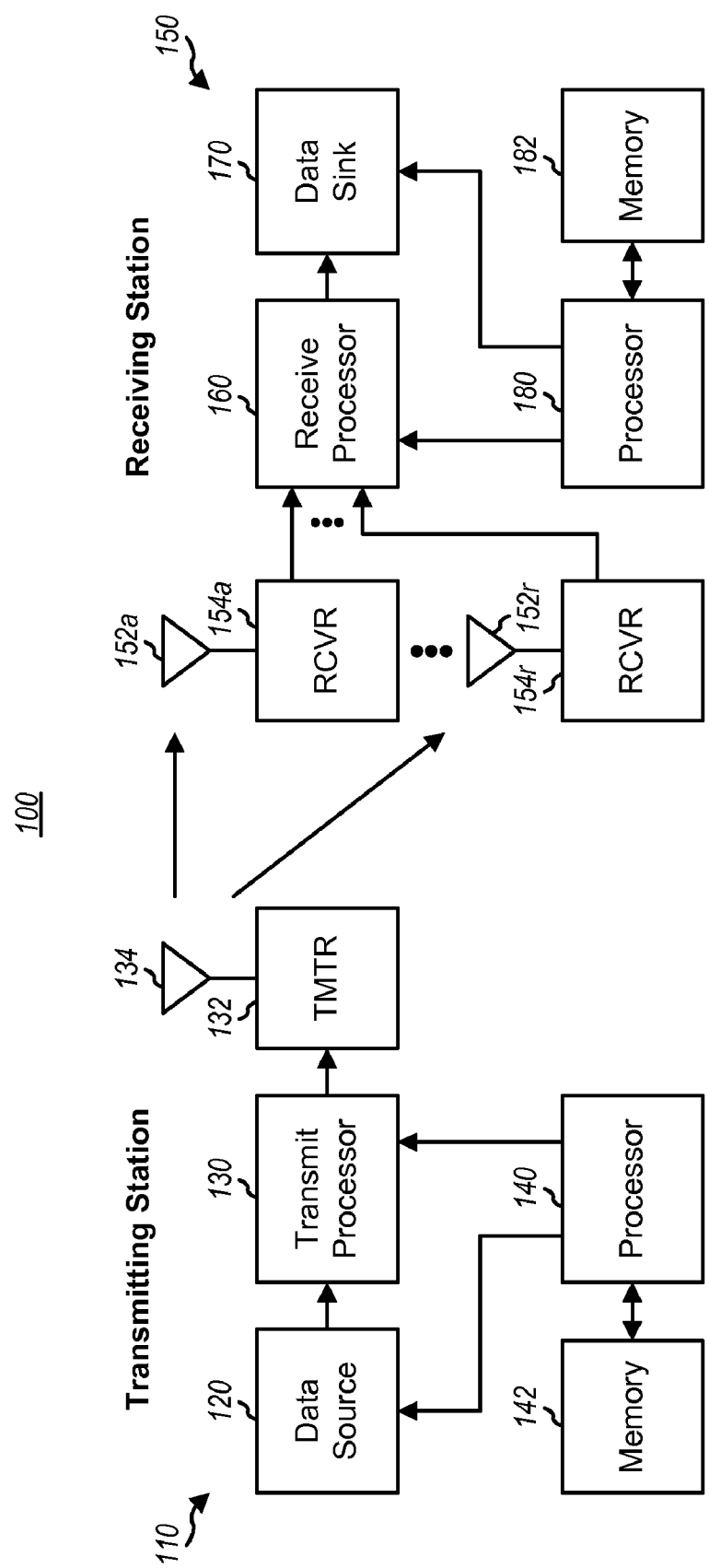
FIG. 1 shows a transmitting station and a receiving station.

FIG. 1 shows a block diagram of a transmitting station 110 and a receiving station 150 in a wireless network 100. Transmitting station 110 is equipped with a single antenna and may be an access point or a user terminal. Receiving station 150 is equipped with multiple (e.g., R=2) antennas and may also be an access point or a user terminal. In general, each station may be equipped with any number of antennas that may be used for data transmission and reception. An access point is generally a fixed station that communicates with the user terminals and may also be called a base station, a base transceiver subsystem (BTS), or some other terminology. A user terminal may be fixed or mobile and may also be called a mobile station, a wireless device, a user equipment (UE), or some other terminology.

At transmitting station 110, a transmit processor 130 receives traffic data from a data source 120, processes the traffic data in accordance with a data rate selected for transmission, and provides output chips. The processing by transmit processor 130 is described below. A transmitter unit (TMTR) 132 processes (e.g., converts to analog, amplifies, filters, and frequency upconverts) the output chips and generates a modulated signal, which is transmitted via an antenna 134.

At receiving station 150, R antennas 152a through 152r receive the transmitted signal, and each antenna 152 provides a received signal to a respective receiver unit (RCVR) 154. An antenna may also be referred to as "diversity", and the R receive antennas provide a diversity order of R. Each receiver unit 154 processes its received signal and provides a stream of input samples to a receive processor 160. Receive processor 160 processes the input samples from all R receiver units 154a through 154r in a manner complementary to the processing performed by transmit processor 130 and provides decoded data to a data sink 170. The decoded data is an estimate of the traffic data sent by transmitting station 110.

Processors 140 and 180 direct the operation of the processing units at transmitting station 110 and receiving station 150, respectively. Memory units 142 and 182 store data and/or program codes used by processors 140 and 180, respectively.

Stations 110 and 150 may support 802.11b and/or 802.11g. 802.11g is backward compatible with 802.11b and supports all of the operating modes defined by 802.11b. Stations 110 and 150 may further support a range extension mode, which supports at least one data rate that is lower than the lowest data rate in 802.11b/g. The lower data rate(s) may be used to extend coverage range, which is beneficial for certain applications such as walkie-talkie.

Table 1 lists the two lowest data rates supported by 802.11b and 802.11g and the processing for each data rate. Table 1 also lists three data rates supported by the range extension mode and the processing for each data rate, in accordance with an embodiment. In Table 1, DBPSK denotes differential binary phase shift keying, and DQPSK denotes differential quadrature phase shift keying.

TABLE 1

| Mode | Data Rate | Code Rate | Modulation | Spreading | Efficiency |
|---|---|---|---|---|---|
| 802.11b/g | 2 Mbps | none | DQPSK | DSSS | 2 bit/sym |
|  | 1 Mbps | none | DBPSK | DSSS | 1 bit/sym |
| Range extension mode | 1 Mbps | ½ | DQPSK | DSSS | 1 bit/sym |
|  | 500 Kbps | ½ | DBPSK | DSSS | 0.5 bit/sym |
|  | 250 Kbps | ¼ | DBPSK | DSSS | 0.25 bit/sym |

For clarity, in the following description, the term "bit" refers to a quantity prior to modulation (or symbol mapping) at the transmitting station, the term "symbol" refers to a quantity after the symbol mapping, and the term "chip" refers to a quantity after spectral spreading. The term "sample" refers to a quantity prior to spectral despreading at the receiving station.

Figure 2:
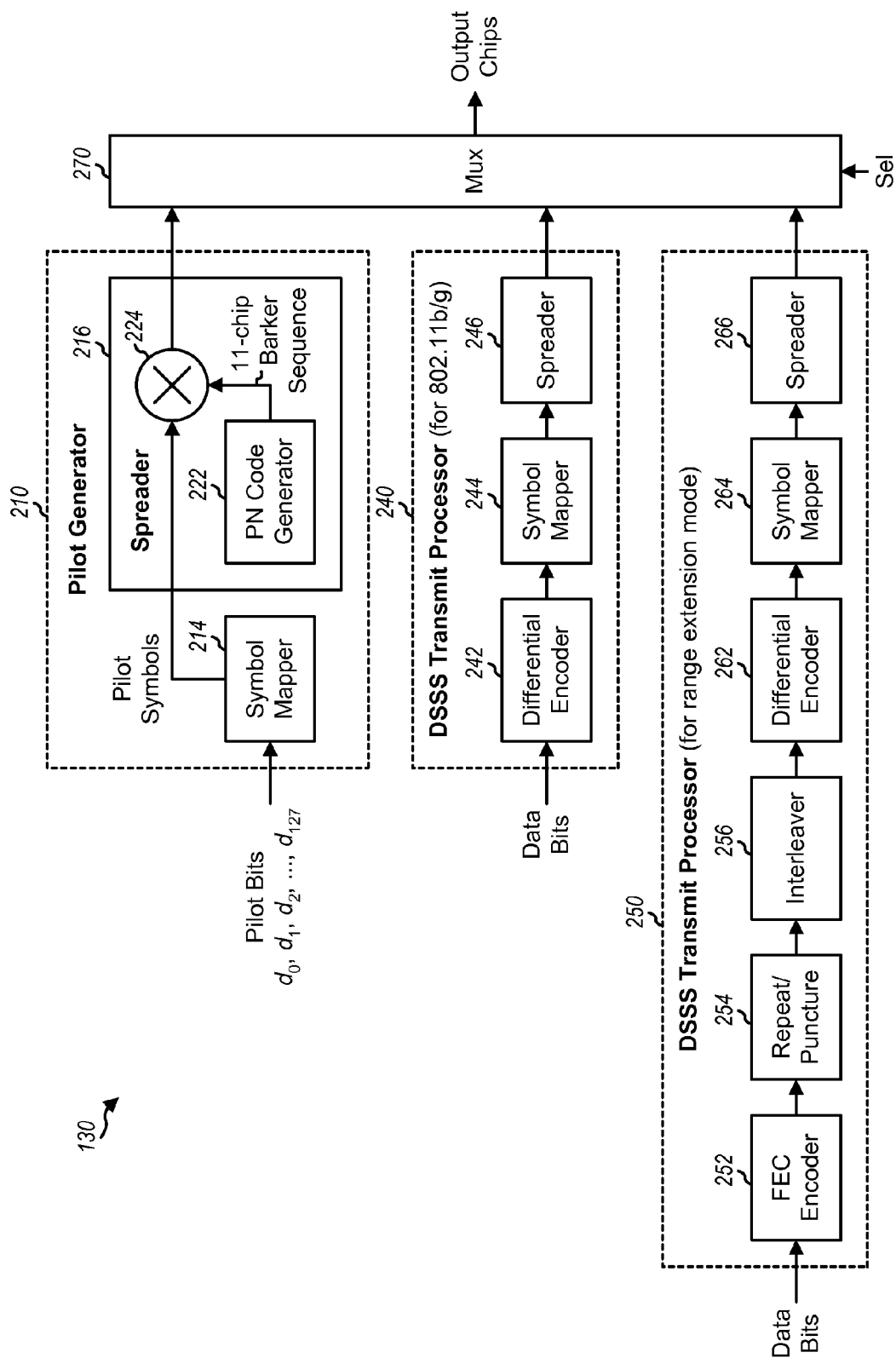
FIG. 2 shows a transmit processor at the transmitting station.

FIG. 2 shows an embodiment of transmit processor 130 at transmitting station 110. Transmit processor 130 includes a pilot generator 210, a DSSS transmit processor 240 for 802.11b/g, a DSSS transmit processor 250 for the range extension mode, and a multiplexer (Mux) 270.

Pilot generator 210 generates a pilot (which is also called a preamble or a reference) for both 802.11b/g and the range extension mode. Within pilot generator 210, a symbol mapper 214 receives pilot bits, maps these bits to modulation symbols based on BPSK, and provides pilot symbols to a spreader 216. As used herein, a pilot symbol is a modulation symbol for pilot, a data symbol is a modulation symbol for traffic data, a modulation symbol is a complex value for a point in a signal constellation for a modulation scheme (e.g., M-PSK or M-QAM), and a symbol is any complex value. Spreader 216 spectrally spreads the pilot symbols and provides output chips. Within spreader 216, a pseudo-random number (PN) code generator 222 generates a PN code sequence. In some embodiments, this may also be called a Barker sequence. The Barker sequence is 11 chips long, has a rate of 11 mega chips/second (Mcps), and is composed of the following 11-chip sequence $\{+1, -1, +1, +1, -1, +1, +1, +1, -1, -1, -1\}$. A multiplier 224 receives pilot symbols at a rate of 1 mega symbols/second (Msps) from symbol mapper 214 and the Barker sequence from PN code generator 222. Multiplier 224 multiplies each pilot symbol with all 11 chips of the Barker sequence, generates 11 output chips for each pilot symbol, and provides a sequence of output chips for the pilot. The output chip rate is 11 times the pilot symbol rate, or 11 Mcps. Each output chip is a complex value to be sent in one chip period $T_c$, which is approximately 90.9 nanoseconds (ns) for 802.11b/g.

DSSS transmit processor 240 performs differential modulation and spectral spreading for 802.11b/g. Within processor 240, a differential encoder 242 receives data bits for traffic data, performs differential encoding on the data bits for DBPSK or DQPSK, and provides differentially-encoded bits. For DBPSK, a data bit of '0' results in a phase change of 0°, and a data bit of '1' results in a phase change of 180°. For DQPSK, a data bit pair of '00' results in a phase change of 0°, a data bit pair of '01' results in a phase change of +90°, a data bit pair of '11' results in a phase change of +180°, and a data bit pair of '10' results in a phase change of +270°. In some embodiments, a symbol mapper 244 maps the differentially-encoded bits to modulation symbols based on BPSK for the 1 Mbps data rate and based on QPSK for the 2 Mbps data rate.

However, other modulation schemes for the rates may be utilized. Symbol mapper 244 provides BPSK modulation symbols at a rate of 1 Msps for the 1 Mbps data rate and provides QPSK modulation symbols at a rate of 1 Msps for the 2 Mbps data rate. A spreader 246 spectrally spreads the data symbols from symbol mapper 244 and provides output chips for the traffic data.

DSSS transmit processor 250 performs forward error correction (FEC) encoding, symbol mapping, and spectral spreading for the range extension mode. Within processor 250, an FEC encoder 252 receives data bits for traffic data, encodes the data bits in accordance with an FEC coding scheme, and provides code bits. FEC encoder 252 may implement a convolutional code, a Turbo code, a low-density parity check (LDPC) code, a block code, some other code, or a combination thereof. A repeat/puncture unit 254 may either repeat or puncture some or all of the code bits to obtain the desired code rate. An interleaver 256 interleaves or reorders the code bits based on an interleaving scheme. A differential encoder 262 performs differential encoding on the interleaved bits, e.g., for DBPSK or DQPSK, and provides differentially-encoded bits. A symbol mapper 264 maps the differentially-encoded bits to modulation symbols based on a modulation scheme, e.g., BPSK or QPSK. A spreader 266 spectrally spreads the data symbols from symbol mapper 264 and provides output chips for the traffic data. Spreaders 246 and 266 may each be implemented in the same manner as spreader 216 and may spread each data symbol with the 11-chip Barker sequence to generate 11 output chips for that data symbol.

Multiplexer 270 receives the output chips from pilot generator 210 and DSSS transmit processors 240 and 250, provides the output chips for the pilot at the appropriate time, provides the output chips from processor 240 if the 802.11b/g mode is selected, and provides the output chips from processor 250 if the range extension mode is selected.

For IEEE 802.11, data is processed by a medium access control (MAC) layer as MAC protocol data units (MPDUs). Each MPDU is processed by a physical layer convergence protocol (PLCP) and encapsulated in a PLCP protocol data unit (PPDU). Each PPDU is processed by a physical layer (as shown in FIG. 2) and transmitted via a wireless channel.

Figure 3:
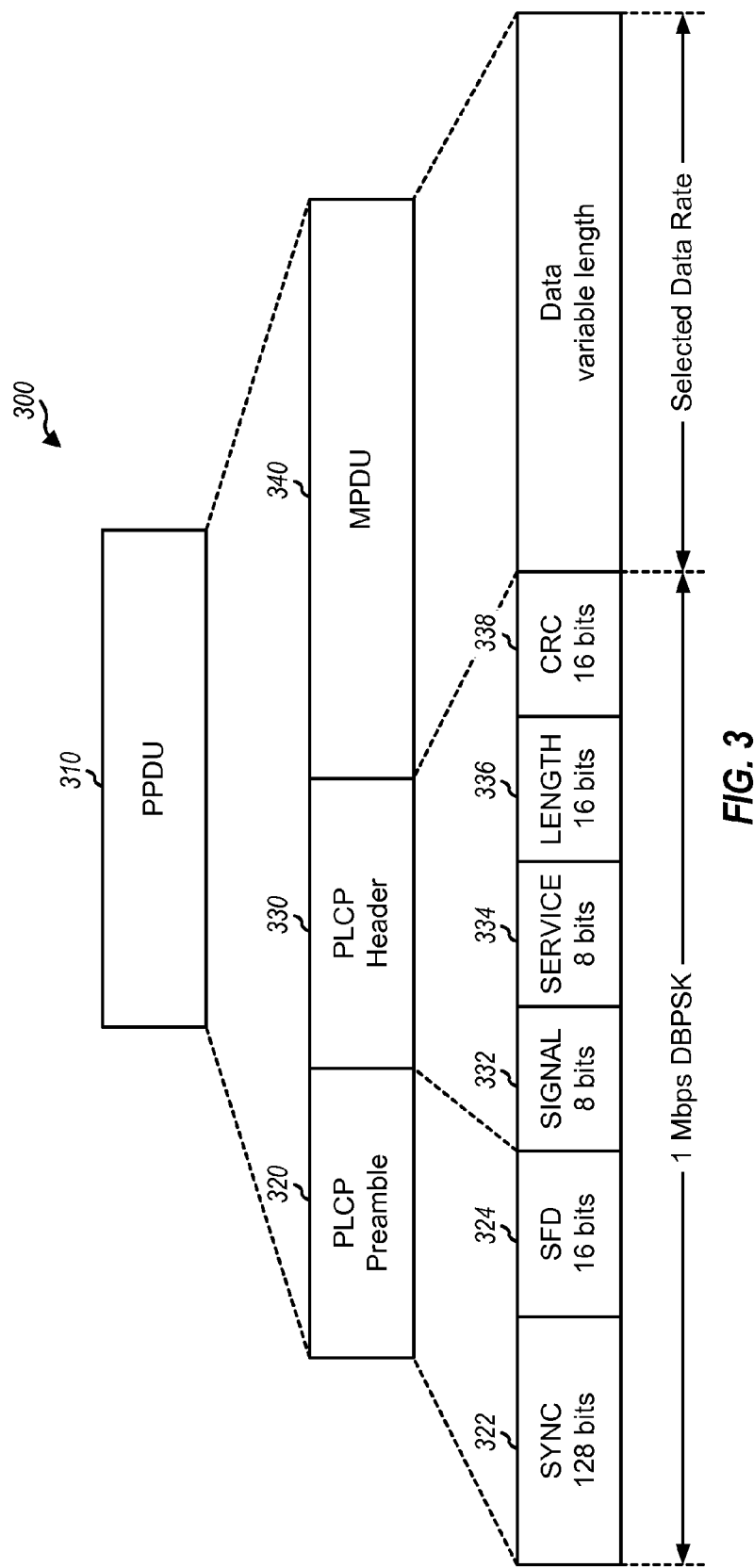
FIG. 3 shows a PPDU structure used by 802.11b/g.

FIG. 3 shows a PPDU structure 300 used by 802.11b/g. For PPDU structure 300, a PPDU 310 includes a PLCP preamble 320, a PLCP header 330, and an MPDU 340. MPDU 340 carries traffic data for PPDU 310 and has a variable length. PLCP preamble 320 includes a PLCP synchronization (SYNC) field 322 and a start frame delimiter (SFD) field 324. SYNC field 322 carries a fixed 128-bit sequence that may be used by a receiving station for signal detection, acquisition, and other purposes. The bits in the 128-bit sequence are denoted as $d_0, d_1, \ldots, d_{127}$. SFD field 324 carries a fixed 16-bit sequence that indicates the start of the PLCP header. PLCP header 330 includes a SIGNAL field 332 that indicates the data rate for the MPDU, a SERVICE field 334 that is set to '0' to signify compliance with IEEE 802.11, a LENGTH field 336 that indicates the amount of time (in units of microseconds) required to send MPDU 340, and a CRC field 338 that carries a CRC value generated based on the SIGNAL, SERVICE, and LENGTH fields. PLCP preamble 320 and PLCP header 330 are sent at 1 Mbps using DBPSK. PLCP preamble 320 contains a total of 144 bits, which are processed to generate 144 BPSK symbols. Each BPSK symbol is composed of 11 output chips, which are obtained by spreading that BPSK symbol with the 11 chips of the Barker sequence. The 144 BPSK symbols are transmitted in 144 symbol periods, with each symbol period having a duration of 1 microsecond (μs).

PPDU structure 300 or another PPDU structure may be used for the range extension mode. The PPDU structure for the range extension mode may include a SYNC field, a CHANEST field that carries a fixed (e.g., 32-bit) sequence used for channel estimation, one or more signaling fields, and an MPDU.

Receiving station 150 performs acquisition to detect for PPDUs sent by transmitting station 110. Acquisition for the range extension mode is more challenging than typical acquisition for 802.11b/g because of the following differences:

1. Low SNR/diversity. The required energy-per-bit-to-total-noise ratio (Eb/No) is lower, e.g. for 802.11b/g it is approximately 8 decibels (dB) whereas the required Eb/No for the range extension mode is approximately 3 dB. The required energy-per-symbol-to-total-noise ratio per diversity order (Es/No/div) is approximately −6 dB at the lowest data rate of 250 kbps. It is desirable to achieve better than 90% detection at this Es/No/div threshold in dispersive channel conditions.

2. Frequency acquisition. An 802.11b/g receiver typically performs differential demodulation. A receiver for the range extension mode may perform coherent demodulation to improve performance. To obtain a good channel estimate used for coherent demodulation, the receiver may need to determine the frequency error between the oscillators at the transmitting and receiving stations. A frequency error of ±20 parts per million (ppm) at the receiving station translates to a frequency error of ±232 KHz at 5.8 GHz, which may degrade performance.

3. Channel estimation. The noise power on the channel estimate should be much lower than the total noise power in order to achieve good performance for coherent demodulation.

Figure 4:
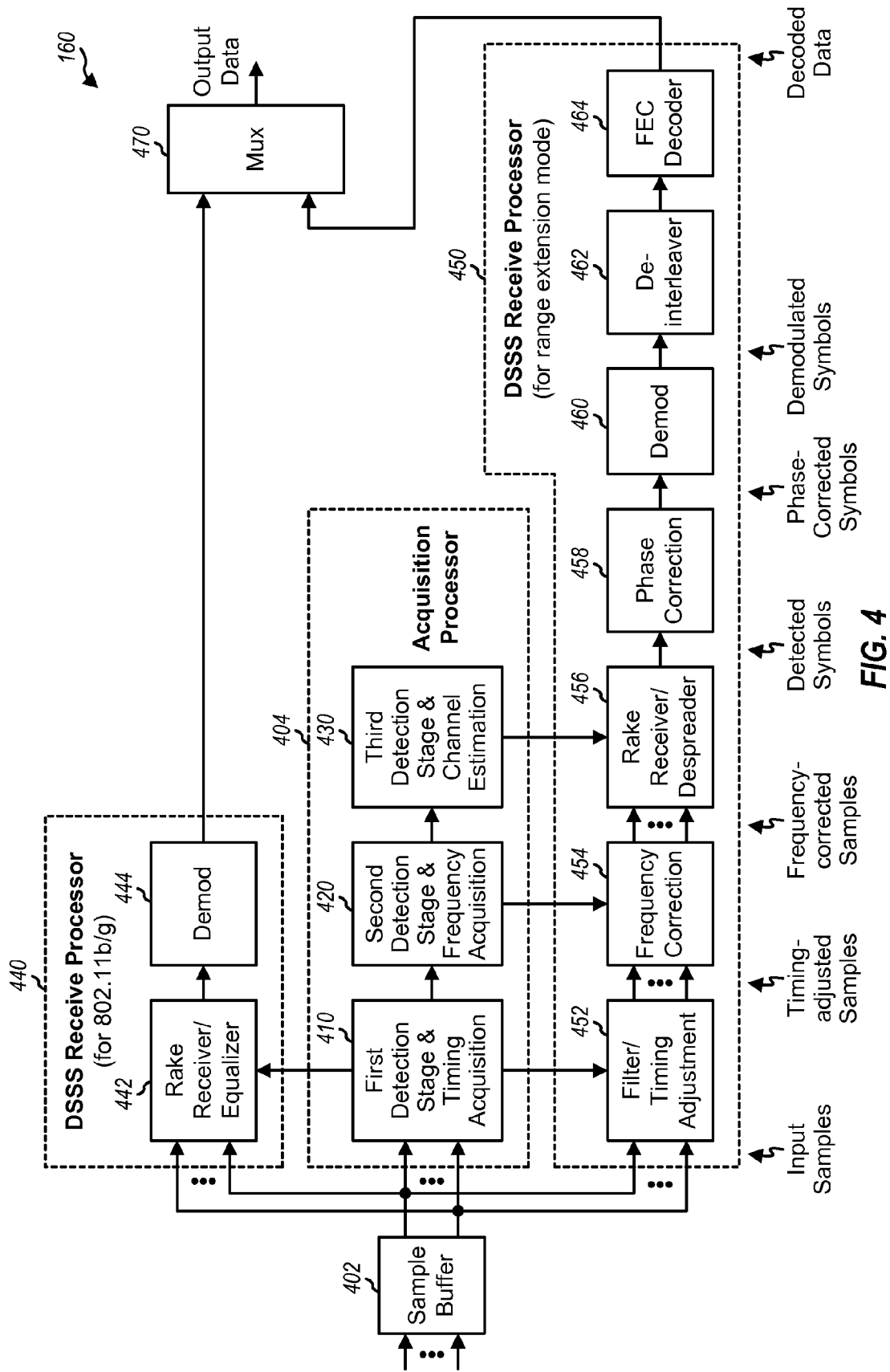
FIG. 4 shows a receive processor at the receiving station.

FIG. 4 shows an embodiment of receive processor 160 at receiving station 150 in FIG. 1. Within receive processor 160, a sample buffer 402 receives a stream of input samples from each of receiver units 154a through 154r. An acquisition processor 404 performs acquisition for PPDUs. Within processor 404, a first detection stage and timing acquisition unit 410 receives the input samples from buffer 402, detects PPDUs, and determines the timing of each detected PPDU. A second detection stage and frequency acquisition unit 420 also detects for PPDUs and further estimates the frequency error in the input samples. A third detection stage and channel estimation unit 430 also detects for PPDUs and further estimates the response of the wireless channel between transmitting station 110 and receiving station 150. Units 410, 420 and 430 may perform processing based on the 128-bit sequence in the SYNC field of the PPDU preamble, as described below.

Figure 5:
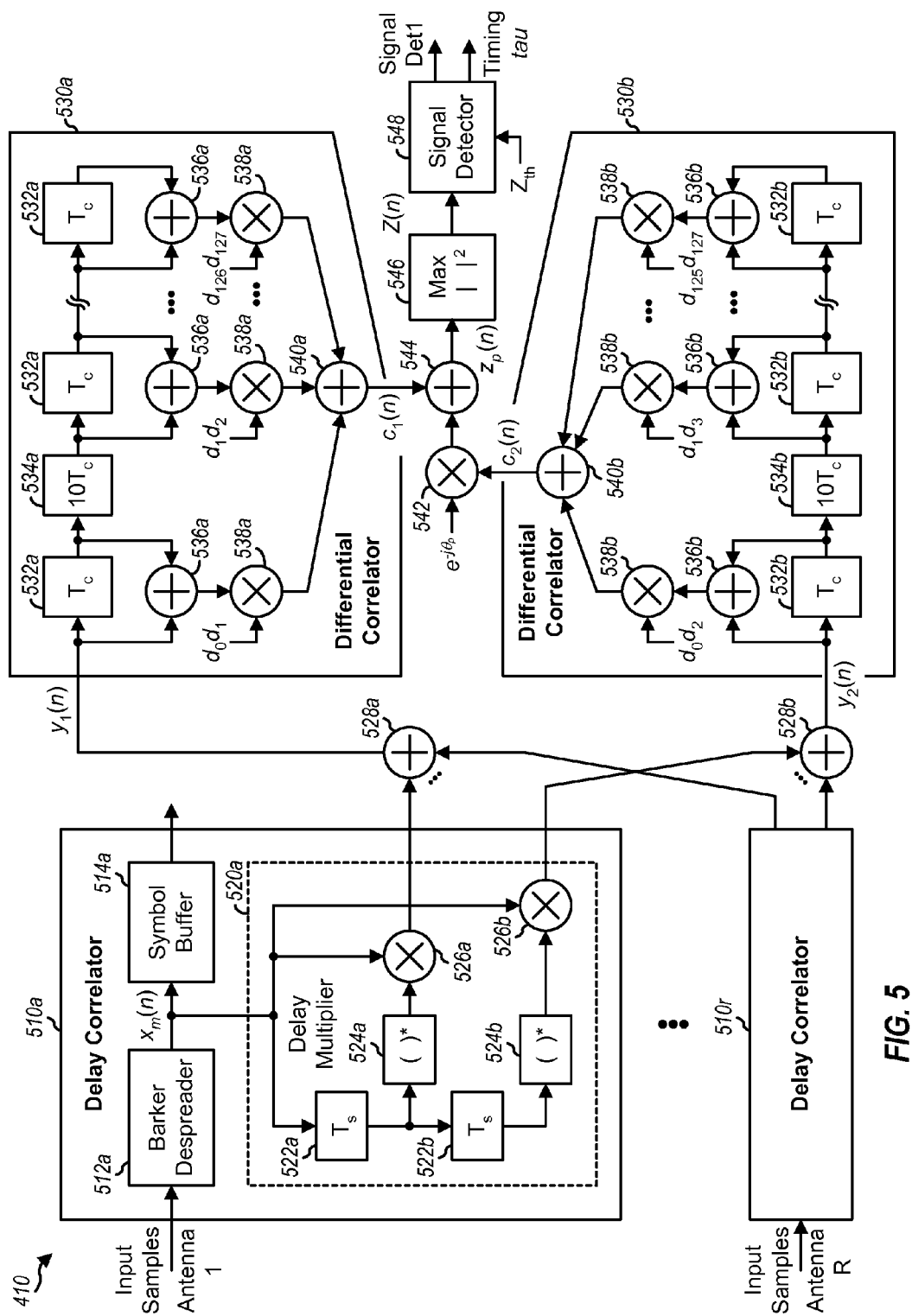
FIG. 5 shows a first detection stage and timing acquisition unit.

FIG. 5 shows an embodiment of first detection stage and timing acquisition unit 410, which performs signal detection using time-domain correlation. Unit 410 operates on complex-valued input samples at the sample rate, which is equal to or higher than the chip rate. For simplicity, the following description assumes that the input samples are provided at the chip rate. In the following description, "m" is an index for receive antenna, "n" is an index for chip period, "k" is an index for frequency bin, and "i" is an index for the 128 bits in the fixed sequence sent in the SYNC field. The symbol rate is equal to the bit rate for the pilot sent in the SYNC field. Coherent sum refers to a sum of complex values, and non-coherent sum refers to a sum of real values (e.g., magnitudes).

Within unit 410, delay correlators 510a through 510r receive the input samples from receiver units 154a through 154r, respectively. Within delay correlator 510a for antenna 1 (or m=1), a Barker despreader 512a despreads the input samples with the 11-chip Barker sequence and provides despread symbols at the chip rate. For each chip period n, Barker despreader 512a multiplies 11 input samples for chip periods n through n−10 with the 11 chips of the Barker sequence, accumulates the results of the multiplication, and provides a despread symbol $x_m(n)$ for that chip period. Barker despreader 512a performs a sliding correlation of the Barker sequence with the input samples to obtain a despread symbol for each chip period (instead of each symbol period) and provides despread symbols to a symbol buffer 514a and a delay multiplier 520a.

Delay multiplier 520a generates 1-symbol and 2-symbol delayed products of the despread symbols. Within delay multiplier 520a, the despread symbols are provided to two series-coupled delay units 522a and 522b, with each delay unit providing a delay of one symbol period $T_s$, which is equal to 11 chip periods, or $T_s=11 \cdot T_c$. Units 524a and 524b provide the complex conjugate of the despread symbols from delay units 522a and 522b, respectively. A multiplier 526a multiplies the despread symbol for each chip period n with the output of unit 524a and provides a 1-symbol delayed product $y_{1,m}(n)$ for that chip period. Similarly, a multiplier 526b multiplies the despread symbol for each chip period n with the output of unit 524b and provides a 2-symbol delayed product $y_{2,m}(n)$ for that chip period.

The delay correlator for each remaining antenna processes the input samples for that antenna in the manner described above for antenna 1. Each delay correlator provides 1-symbol delayed products $y_{1,m}(n)$ and 2-symbol delayed products $y_{2,m}(n)$ for an associated antenna m. For each chip period n, a summer 528a coherently sums the products $y_{1,m}(n)$, for m=1, . . . , from all R delay correlators 510a through 510r and provides a product $y_1(n)$ for that chip period. For each chip period n, a summer 528b sums the products $y_{2,m}(n)$, for m=1, . . . , R, from all delay correlators 510a through 510r and provides a product $y_2(n)$ for that chip period. The products $y_1(n)$ and $y_2(n)$ may be expressed as:

$$y_1(n) = \sum_{m=1}^{R} x_m(n) \cdot x_m^*(n - T_s), \text{ and} \quad \text{Eq (1a)}$$

$$y_2(n) = \sum_{m=1}^{R} x_m(n) \cdot x_m^*(n - 2T_s). \quad \text{Eq (1b)}$$

The 1-symbol delayed product $y_{1,m}(n)$ is indicative of the phase difference between two despread symbols $x_m(n)$ and $x_m(n-T_s)$ that are separated by one symbol period for antenna m. The 2-symbol delayed product $y_{2,m}(n)$ is indicative of the phase difference between two despread symbols $x_m(n)$ and $x_m(n-2T_s)$ that are separated by two symbol periods for antenna m. FIG. 5 shows the use of 1-symbol and 2-symbol delayed products for signal detection. In general, products for any number of different delays (e.g., 1, 2, 3 symbol periods, and so on) may be used for signal detection. Using products for more delays may improve SNR and detection performance. However, since frequency offset causes phase rotation in the input samples, the maximum delay may be limited by the frequency offset. The amount of delay also affects the complexity of differential correlators 530a and 530b. For example, there are 127 multiply and accumulate operations for a delay of one symbol period, 126 multiply and accumulate operations for a delay of two symbol periods, and so on.

Differential correlators 530a and 530b receive the products $y_1(n)$ and $y_2(n)$, respectively. Within differential correlator 530a, the products $y_1(n)$ are provided to a sequence of alternating delay elements 532a and 534a. Each delay element 532a provides a delay of one chip period, each delay element 534a provides a delay of 10 chip periods, each pair of adjacent delay elements 532a and 534a provides a delay of 11 chip periods (which is one symbol period), and the entire sequence of delay elements 532a and 534a provides a delay of approximately 126 symbol periods. A set of 127 adders 536a couples to the 127 delay elements 532a. Each adder 536a sums the input and output of an associated delay element 532a and provides an output $y_1(n-11 \cdot i) \cdot y_1(n-11 \cdot i-1)$, where $i \in \{0, \ldots, 126\}$. A set of 127 multipliers 538a couples to the set of 127 adders 536a and also receives a 1-symbol differential sequence containing 127 known values. This sequence is formed by a bit-wise product of a first sequence of $d_0$ through $d_{126}$ with a second sequence of $d_1$ through $d_{127}$, where $d_0$ through $d_{127}$ are the 128 bits of the fixed sequence (or pilot bits) used for the SYNC field. Since the pilot bits are real-valued, $d_i d^*_{i+1} = d_i d_{i+1}$ for $i \in \{0, \ldots, 126\}$. Each multiplier 538a multiplies the output of an associated summer 536a with $d_i d_{i+1}$. For each chip period n, an adder 540a adds the outputs from all 127 multipliers 538a and provides a correlation result $c_1(n)$ for that chip period.

Differential correlator 530b is similar to differential correlator 530a. The products $y_2(n)$ are provided to a sequence of alternating delay elements 532b and 534b that provides a delay of approximately 125 symbol periods. A set of 126 adders 536b couples to 126 delay elements 532b. Each adder 536b sums the input and output of an associated delay element 532b and provides an output $y_2(n-11 \cdot i) \cdot y_2(n-11 \cdot i-1)$, where $i \in \{0, \ldots, 125\}$. A set of 126 multipliers 538b couples to the set of 126 adders 536b and also receives a 2-symbol differential sequence containing 126 known values. This sequence is formed by a bit-wise product of a sequence of $d_0$ through $d_{125}$ with a sequence of $d_2$ through $d_{127}$. Each multiplier 538b multiplies the output of an associated summer 536b with $d_i d_{i+2}$. For each chip period n, an adder 540b adds the outputs from all 126 multipliers 538b and provides a correlation result $c_2(k)$ for that chip period.

Differential correlator 530a performs correlation between the 1-symbol delayed products $y_1(n)$ with the 1-symbol differential sequence. Differential correlator 530b performs correlation between the 2-symbol delayed products $y_2(n)$ with the 2-symbol differential sequence. The embodiment shown in FIG. 5 assumes that the wireless channel has a delay spread (i.e., dispersion or smear) of a few chips. Summers 536a and 536b are used to collect energy across this delay spread. The energy may also be collected over more chips for a larger delay spread, or may be omitted if the wireless channel has zero or very little delay spread (e.g., for a strong line-of-sight path).

Each differential correlator 530 provides a correlation result for each chip period. The phases of the correlation results $c_2(n)$ from differential correlator 530b may not be aligned with the phases of the corresponding correlation results $c_1(n)$ from differential correlator 530a. A multiplier 542 multiplies each correlation result $c_2(n)$ from differential correlator 530b with a complex phasor $e^{-j\theta_p}$ for L different hypothesized phases and provides a set of L phase-rotated correlation results. For example, the hypothesized phases may be $\{0, 90°, 180°, -90°\}$ for L=4, $\{0, 60°, -60°\}$ for L=3, and so on. The L hypothesized phases may be selected to cover the possible range of relative phases. For example, the maximum frequency offset may be 232 KHz for a frequency error of ±20 ppm and a 5.8 GHz carrier frequency. The maximum difference in phase between the 1-symbol and 2-symbol delayed correlations is ±232 KHz times 1 μs, which is approximately 90 degrees. Hence, if hypothesized phases of 0, 60°, and −60° are used, then least one hypothesized phase is within 30°. If the phase difference is larger (e.g., due to the use of a larger delay or a larger frequency offset), then the hypothesized phases should cover a larger range, up to the full ±180°.

Multiplier 542 rotates $c_2(n)$ by different phases. For each chip period n, an adder 544 coherently adds the correlation result $c_1(n)$ from adder 540a with each of the L corresponding phase-rotated correlation results from multiplier 542 and provides L combined correlation results $z_p(n)$, for p=1, . . . , L. If K differential correlators are used for K different delays, where K>1, then one differential correlator may be used as the reference (with no phase shift). One combined correlation result is then obtained for each hypothesis corresponding to a specific phase for each of the K−1 remaining differential correlators. For example, if K=3, then one combined correlation result is obtained for each hypothesis corresponding to a different pair of hypothesized phases for two differential correlators. Up to $L^{K-1}$ combined correlation results are obtained for the $L^{K-1}$ possible hypotheses. For each chip period n, a unit 546 computes the squared magnitude of each of the L combined correlation results (for K=2), identifies the largest squared magnitude value among the L squared magnitude values, and provides this largest squared magnitude value Z(n). For each chip period n, a signal detector 548 compares the largest squared magnitude value Z(n) against a predetermined threshold $Z_{th}$ and declares the presence of a PPDU if Z(n) exceeds the threshold, or $Z(n) > Z_{th}$. Signal detector 548 continues to monitor the squared magnitude values to search for a peak value and provides the chip period for this peak value as an initial timing tau for the detected PPDU.

Alternatively, the correlation results $c_1(n)$ and $c_2(n)$ for each chip period may be non-coherently combined. This may be achieved by computing the squared magnitude of $c_1(n)$, computing the squared magnitude of $c_2(n)$, and summing the two squared magnitudes to obtain Z(n). The threshold $Z_{th}$ may be set to different values depending on how Z(n) is derived.

The threshold $Z_{th}$ used for the first detection stage may be an adaptive threshold that varies, e.g., with the received energy $E_{rx}$ for the 128-bit SYNC field. For example, the threshold $Z_{th}$ may be set equal to the received energy $E_{rx}$ times a scaling factor $S_1$, or $Z_{th} = E_{rx} \cdot S_1$. The use of normalized received energy for signal detection results in similar detection performance for a wide range of received signal levels. Computer simulation indicates that a detection probability of approximately 90% and a false alarm rate of less than 1% may be achieved for a 2 equal-path uncorrelated Rayleigh channel at a total SNR of −3 dB using $S_1 = 22$. Detection probability refers to the likelihood of correctly declaring the presence of a PPDU when the PPDU is sent. False alarm rate refers to the likelihood of erroneously declaring the presence of a PPDU when none is sent. A tradeoff between detection probability versus false alarm rate may be made by selecting a suitable value for the scaling factor $S_1$.

Figure 6:
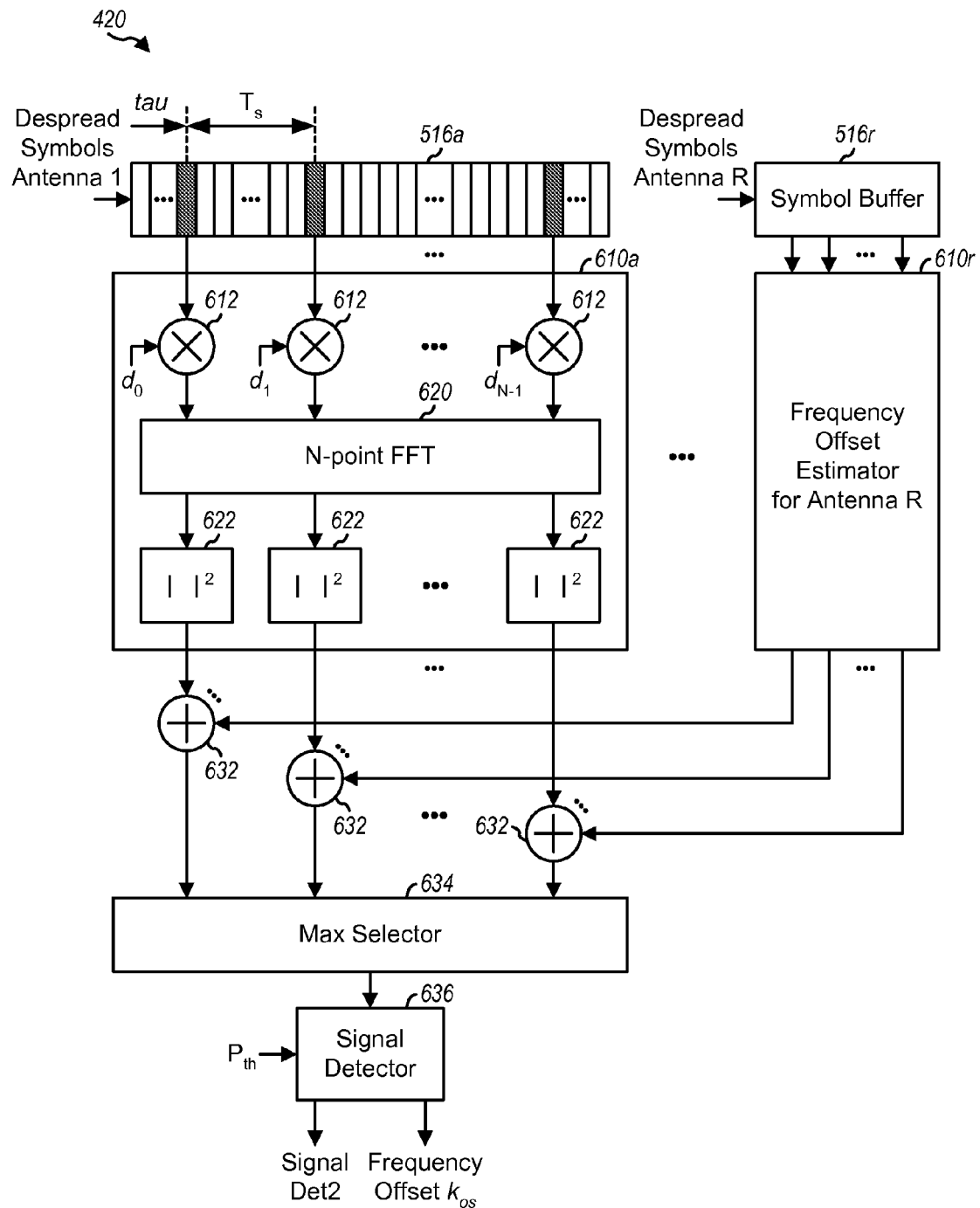
FIG. 6 shows a second detection stage and frequency acquisition unit.

FIG. 6 shows an embodiment of second detection stage and frequency acquisition unit 420, which performs signal detection using frequency-domain processing. For this embodiment, unit 420 includes R frequency offset estimators 610a through 610r for the R receive antennas. Each frequency offset estimator detects the energies in different frequency bins to determine the frequency offset in the input samples from an associated antenna.

For receive antenna 1 (m=1), symbol buffer 516a provides N despread symbols that are spaced apart by 11 chip periods (or one symbol period) starting at the initial timing tau provided by timing acquisition unit 410. The first despread symbol is thus time-aligned with the best timing hypothesis from the timing acquisition stage. In general, N may be any integer that is a power of two and does not exceed 128, e.g., N may be 32, 64, or 128. Within frequency offset estimator 610a, a set of N multipliers 612 receives the N despread symbols from symbol buffer 514a and N corresponding pilot bits in the 128-bit sequence. Each multiplier 612 multiplies its despread symbol with its pilot bit to remove the modulation on that despread symbol. An N-point fast Fourier transform (FFT) unit 620 receives the N outputs from N multipliers 612, performs an N-point FFT on these N outputs, and provides N frequency-domain values for N frequency bins. A set of N units 622 receives the N frequency-domain values from FFT unit 620. Each unit 622 computes the squared magnitude of its frequency-domain value and provides the detected energy for a respective frequency bin k.

After removing the modulation with multipliers 612, the N outputs from these multipliers may have a periodic component. This periodic component is caused by a frequency offset in the oscillator at receiving station 150, which results in the received signal not being frequency downconverted exactly to DC. FFT unit 620 provides a spectral response of the N outputs from multipliers 612. The frequency bin k with the largest detected energy is indicative of the frequency offset for the input samples from antenna m.

The frequency offset estimator for each remaining receive antenna processes the despread symbols for that antenna in the manner described for antenna 1. A set of N adders 632 receives R sets of N detected energies from R frequency offset estimators 610a through 610r for the R receive antennas. Each adder 632 adds the detected energies from all R frequency offset estimators 610a through 610r for an associated frequency bin k and provides the total detected energy E(k) for that frequency bin. A selector 634 selects the largest total detected energy $E_{max}(k)$ among the N total detected energies for the N frequency bins. A signal detector 636 compares the largest total detected energy $E_{max}(k)$ against a predetermined threshold $E_{th}$, declares signal detection if $E_{max}(k)$ is greater than the threshold $E_{th}$, and provides the frequency bin with the largest total detected energy as the estimated frequency error $k_{os}$. The threshold $E_{th}$ may be set equal to, e.g., the received energy $E_{rx}$ for the 128-bit SYNC field times a scaling factor $S_2$, or $E_{th} = E_{rx} \cdot S_2$.

The embodiment shown in FIG. 6 utilizes an N-point FFT, where N≦128. If N=64, which is the FFT size commonly used for 802.11b and 802.11g for OFDM, then the spacing between adjacent frequency bins is 15.625 KHz for the 1 Msps symbol rate, and the uncertainty in the frequency offset estimate is half of the bin spacing or 7.812 KHz. This uncertainty may be reduced by performing interpolation and/or using a larger 128-point FFT.

The processing gain for coherent accumulation by the FFT is approximately 18 dB for N=64. The worst-case coherent integration loss is nearly 4 dB, which occurs when the actual frequency offset is exactly between two frequency bins. A minimum total integrated SNR of almost 14 dB may be achieved for N=64. Most of the coherent integration loss may be recovered by summing the detected energies for pairs of adjacent frequency bins (e.g., similar to the summing performed by adders 536a and 536b in FIG. 5) prior to selecting the largest total detected energy. Summing the detected energies for adjacent frequency bin pairs improves the detection probability at a cost of a small increase in the false alarm rate. A detection probability of better than 90% at an SNR of −7 dB and better than 99.9% at an SNR of −4 dB may be achieved using a threshold of $S_2 = 8$. The false alarm probability is less than 0.5% for the second detection stage, yielding an aggregate false alarm rate of $5 \times 10^{-5}$ for both the first and second detection stages.

Multipath may degrade the detection probability since all of the energy is not used in the second detection stage (due to the FFT operating at the symbol spacing instead of chip spacing). In an embodiment, improved detection performance may be achieved for the second detection stage by performing a 128-point FFT and hence integrating over the entire 128-bit sequence for the SYNC field. In another embodiment, one 64-point FFT may be performed for the first half of the 128-bit sequence as described above, another 64-point FFT may be performed for the second half of the 128-bit sequence, and the detected energies for the two FFTs may be non-coherently summed by adders 632.

In another embodiment of frequency offset estimation, the input samples are correlated with the known 128-bit sequence for different hypothesized frequency offsets. For each hypothesized frequency offset, the input samples are rotated by that frequency offset, the rotated samples are correlated with the 128-bit sequence, the correlation result is compared against a threshold, and signal detection is declared if the correlation result exceeds the threshold. The correlation may be performed in the time domain with a finite impulse response (FIR) filter structure or in the frequency domain with an FFT-multiply-IFFT operation. The frequency offset estimate is determined by the hypothesized frequency error that yields the largest correlation result exceeding the threshold.

In yet another embodiment of frequency offset estimation, the input samples are initially despread to obtain despread symbols at chip rate, as shown in FIG. 5. The despread symbols are then multiplied with the corresponding pilot bits to remove the pilot modulation. The resultant symbols are used to generate 1-symbol and 2-symbol delayed products, e.g., using delay multiplier 520a in FIG. 5. The delayed products for each delay are processed to generate a complex value for that delay. For each delay d, where d={1, 2}, the d-symbol delayed products are provided to a set of 10 series-coupled chip-spaced delay elements (e.g., similar to delay elements 722 in FIG. 7) to obtain d-symbol delayed products at 11 different chip offsets. The d-symbol delayed products for each chip offset is coherently accumulated across the SYNC field (e.g., using switches 724 and accumulators 730 in FIG. 7). The 11 accumulated results for the 11 chip offsets may be combined (e.g., using maximal ratio combining) to generate a complex value $V_d$ for delay d. The phase difference between the complex values $V_1$ and $V_2$ for 1-symbol and 2-symbol delays may be computed and used to derive the frequency offset. The R receive antennas may be combined in various manners, e.g., the delayed products may be combined across antennas as shown in FIG. 5, the complex values for different antennas may be combined for each delay d, and so on. More than two delays and/or a larger delay may also be used for frequency estimation. A larger delay results in a larger phase difference, which provides better resolution for the frequency offset. However, a larger delay may result in ambiguity, e.g., a phase shift of more than 180° may be interpreted as a negative shift of less than 180°. For a given the number of delays and a given maximum frequency offset, a set of delays may be selected to optimize resolution without ambiguity.

Regardless of the technique used for frequency estimation, the estimated frequency offset $k_{os}$ from frequency acquisition unit 420 typically contains residual frequency error. To estimate this residual frequency error, a first 11-tap channel estimate may be derived based on the first 64 bits of the SYNC field (e.g., as described below), a second 11-tap channel estimate may be derived based on the last 64 bits of the SYNC field, with both channel estimates being derived with the frequency offset $k_{os}$ removed. The product of the second channel estimate and the complex conjugate of the first channel estimate may be computed, on a per tap basis. The 11 resultant products may be coherently summed to obtain the phase difference between the two channel estimates. Thresholding may be performed on (1) each channel tap prior to computing the product and/or (2) each product prior to summing the products. The thresholding removes channel taps with low energy below a predetermined threshold. The residual frequency error may be estimated based on the phase difference between the two channel estimates and may be provided to filter 452 and/or frequency correction unit 454 and used to correct the timing and/or the frequency of the input samples (not shown in FIG. 4). This updating of the frequency offset $k_{os}$ with the residual frequency error estimate may improve demodulation performance.

Figure 7:
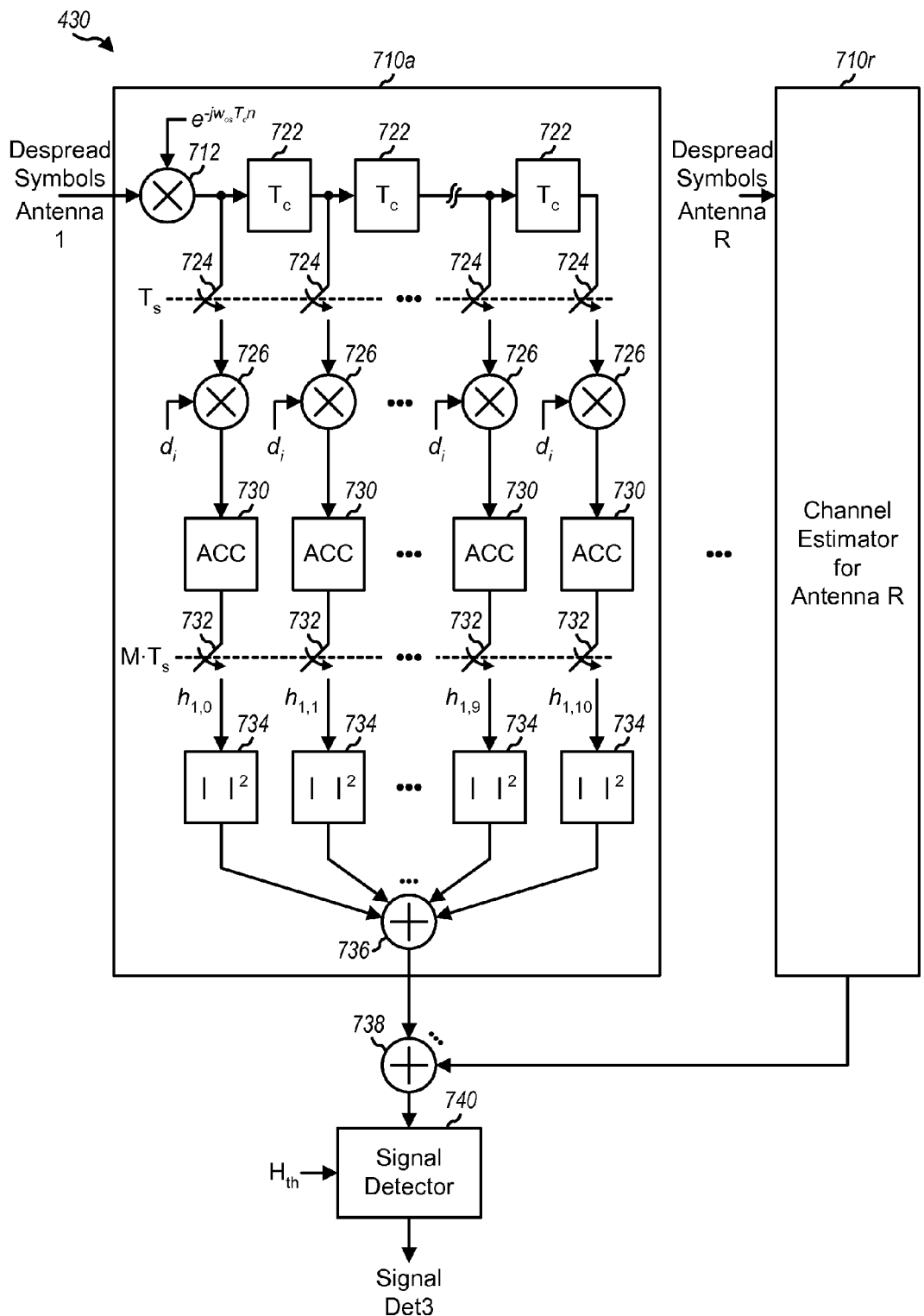
FIG. 7 shows a third detection stage and channel estimation unit.

FIG. 7 shows an embodiment of third detection stage and channel estimation unit 430, which performs signal detection using time-domain processing. For this embodiment, unit 430 includes R channel estimators 710a through 710r for the R receive antennas. Each channel estimator may derive a channel impulse response estimate containing channel taps that are spaced at the sample rate. For example, up to 11 channel taps spaced by one chip may be obtained if despread symbols are obtained at the chip rate, up to 22 channel taps spaced by half chip may be obtained if despread symbols are obtained at the twice the chip rate (or chip×2), and so on. For the embodiment shown in FIG. 7, each channel estimator derives an 11-tap channel impulse response estimate at chip spacing for an associated antenna.

Within channel estimator 710a for antenna 1 (m=1), a multiplier 712 multiplies the despread symbols for antenna m with a complex phasor $e^{-j\omega_{os}T_c n}$ to remove the frequency error $k_{os}$ determined by frequency acquisition unit 420. Multiplier 712 provides frequency-corrected symbols at the chip rate to a set of 10 series-coupled delay elements 722. Each delay element 722 provides a delay of one chip period. A set of 11 switches 724 couples to the output of multiplier 712 and the outputs of the 10 delay elements 722. Switches 724 are enabled for one chip period in each symbol period and provide 11 frequency-corrected symbols for that symbol period. The control signal for switches 724 is determined by the initial timing tau from timing acquisition unit 410 and is generated such that the frequency-corrected symbol from the fifth delay element 722 (which is for the center tap of an 11-tap channel impulse response estimate) corresponds to the best timing hypothesis provided by the timing acquisition stage.

Channel estimation is performed over a predetermined time window W, which is selected to achieve adequate SNR or quality for the channel estimates. The time window W may be M symbol periods long, where M may be, e.g., M>31. A set of 11 multipliers 726 receives the pilot bit $d_i$ for each symbol period in which channel estimation is performed. Each multiplier 726 multiplies the output of a respective switch 724 with the pilot bit $d_i$, removes the modulation by the pilot bit, and provides its output to a respective accumulator 730. The set of 11 accumulators 730 is reset at the start of the channel estimation. Each accumulator 730 coherently accumulates the output of a respective multiplier 726 over the time window W. A set of 11 switches 732 couples to the set of 11 accumulators 730. Switches 732 are enabled at the end of the time window W and provide the 11 channel taps $h_{m,0}$ through $h_{m,10}$ for the channel impulse response estimate for antenna m. This channel estimate may be used for data demodulation, as described below. A set of 11 units 734 receives the 11 channel taps, and each unit 734 computes a squared magnitude of its channel tap. A summer 736 sums the outputs from all 11 units 734 and provides the total energy for all channel taps for antenna m. Alternatively, the output of each unit 734 may be compared against a threshold value, and summer 736 may sum only the outputs that exceed the threshold value. The threshold value may be set to a predetermined percentage of the total energy for all 11 channel taps.

The channel estimator for each remaining receive antenna processes the despread symbols for that antenna in the manner described above for antenna 1. A summer 738 sums the total energies from all R channel estimators 710a through 710r and provides the total energy H for all R antennas. A signal detector 740 compares the total energy H against a predetermined threshold $H_{th}$ and declares signal detection if H exceeds the threshold $H_{th}$. The threshold $H_{th}$ may be set equal to, e.g., the received energy $E_{rx}$ for the 128-bit SYNC field times a scaling factor $S_3$, or $H_{th}=E_{rx} \cdot S_3$.

A detection probability of better than 99% and a false alarm rate of less than $10^{-5}$ may be achieved at an SNR of −4 dB using a threshold of $S_3=14$. An aggregate false alarm rate of less than $10^{-9}$ may be achieved with all three detection stages. This assumes that the three detection stages are uncorrelated because different types of signal processing are used for the three stages.

For the embodiments described above, signal detection may be achieved based on time-domain correlation (FIG. 5), frequency-domain processing (FIG. 6), and time-domain processing (FIG. 7). All three types of signal processing may be used to provide good detection performance (e.g., a high detection probability and a low false alarm rate) for poor channel conditions (e.g., a low SNR). Any combination of signal processing may also be used for signal detection.

FIGS. 5, 6 and 7 show specific embodiments of signal detection, timing acquisition, frequency acquisition, and channel estimation, which may be performed in other manners. For example, signal detection and timing acquisition may be performed with just 1-bit delayed differential correlator 530a. A combination of techniques may also be used. For example, the input samples may be rotated for few (e.g., two) hypothesized frequency offsets. The residual frequency error is smaller for one of the hypothesized frequency offsets, so the Barker despreading (or coherent accumulation) may be performed over a longer duration (e.g., 22 chips). The despread symbols from the longer coherent accumulation may be provided to the delay multiplier and differential correlator shown in FIG. 5. Signal detection may be achieved for a lower operating SNR since coherent accumulation is performed over a longer duration.

FIGS. 5, 6 and 7 show exemplary signal processing by units 410, 420 and 430, respectively. The processing may be implemented in various manners using hardware, software, and/or firmware. For example, units 410, 420 and 430 may be implemented with dedicated hardware or may share hardware. A digital signal processor (DSP) and/or some other type of processor may perform the processing for units 410, 420 and 430 in a time division multiplexed manner. Sample buffer 402, symbol buffer 514, and/or some other buffer may be used to buffer data for processing.

Referring back to FIG. 4, once a PPDU has been detected, a determination is made whether the received PPDU is for 802.11b/g or the range extension mode, e.g., based on the PLCP preamble and/or PLCP header. A DSSS receive processor 440 processes the received PPDU if it is for 802.11b/g. A DSSS receive processor 450 processes the received PPDU if it is for the range extension mode.

DSSS receive processor 440 performs spectral despreading and demodulation for 802.11b/g. Within processor 440, a rake receiver/equalizer 442 despreads the input samples with the Barker sequence, equalizes the despread symbols based on the channel estimates, combines signal components across the R receive antennas, and provides detected symbols. A demodulator (Demod) 444 demaps the detected symbols based on the modulation scheme (e.g., BPSK or QPSK) used for transmission, performs differential decoding, and provides output bits, which are estimates of the data bits sent by transmitting station 110.

DSSS receive processor 450 performs spectral despreading, demodulation, and FEC decoding for the range extension mode. Within processor 450, a filter 452 filters the input samples for each receive antenna to remove out-of-band noise and interference. Filter 452 may also resample the input samples for each receive antenna (1) for sample rate conversion from the sampling rate to the chip rate and/or (2) to compensate for timing drift across the received PPDU. For 801.11g, the input samples are typically at multiple times the OFDM chip rate of 20 MHz. In this case, filter 452 may perform resampling from multiple times 20 MHz to either 11 MHz for a chip-spaced rake receiver or 22 MHz for a half chip-spaced rake receiver. The local oscillator (LO) signal used for frequency downconversion and the sampling clock used to generate the input samples are typically derived from the same reference oscillator. In this case, the frequency error in the sampling clock may be determined based on the frequency error $k_{os}$ determined by frequency acquisition unit 420 for the LO signal. The timing drift in the input samples may then be determined based on the frequency offset $k_{os}$ and the carrier frequency. Filter 452 may make periodic adjustment of $\pm T_{adj}$ based on the frequency offset $k_{os}$, where $T_{adj}$ may be a fraction of a sample period.

In an embodiment, filter 452 is implemented as a polyphase filter composed of a bank of N base filters, where N>1. Each base filter is associated with a specific set of coefficients for a specific time offset. In an exemplary design, filter 452 includes 11 FIR filters, with each FIR filter having four taps. A different base filter may be used to produce each successive output sample. If the frequency offset is zero, then the 11 base filters may be cycled through in a fixed order, with every 11-th sample coming from the same base filter. In order to compensate for timing drift, a given base filter may be skipped and the next base filter may be used instead, or the same base filter may be used for two successive output samples. Timing adjustment may thus be achieved by selecting an appropriate base filter in use.

A frequency correction unit 454 removes the frequency offset in the timing-adjusted samples for each receive antenna. Unit 454 may be implemented with a numerically controlled oscillator (NCO) and a complex multiplier, similar to multiplier 712 in FIG. 7. The NCO generates a phasor rotating at the offset frequency $k_{os}$ provided by frequency acquisition unit 420. The multiplier multiplies the timing-adjusted samples for each receive antenna with the phasor and provides frequency-corrected samples for that antenna.

A rake receiver/despreader 456 performs coherent detection of the frequency-corrected samples with the channel estimates and combines signal components across receive antennas and multipaths. Rake receiver 456 multiplies the frequency-corrected samples for each receive antenna with the 11 channel taps provided by channel estimation unit 430 for that antenna. Rake receiver/despreader 456 also performs despreading with the Barker sequence, accumulates the despread symbols for all R antennas, and provides detected symbols. In an embodiment, the channel estimates for the R receive antennas are derived once based on the SYNC field and possibly other fields of the received PPDU, and these channel estimates are used for the entire received PPDU. For this embodiment, rake receiver 456 is not tracking the wireless channel across the received PPDU. In another embodiment, the channel estimates are updated using hard decisions obtained from the detected symbols and/or decisions obtained by re-encoding and re-mapping the output of an FEC decoder 464.

A phase correction unit 458 removes phase error in the detected symbols. The phase error is due to a residual frequency error that results from receiver 160 not being phase-locked.

Figure 8:
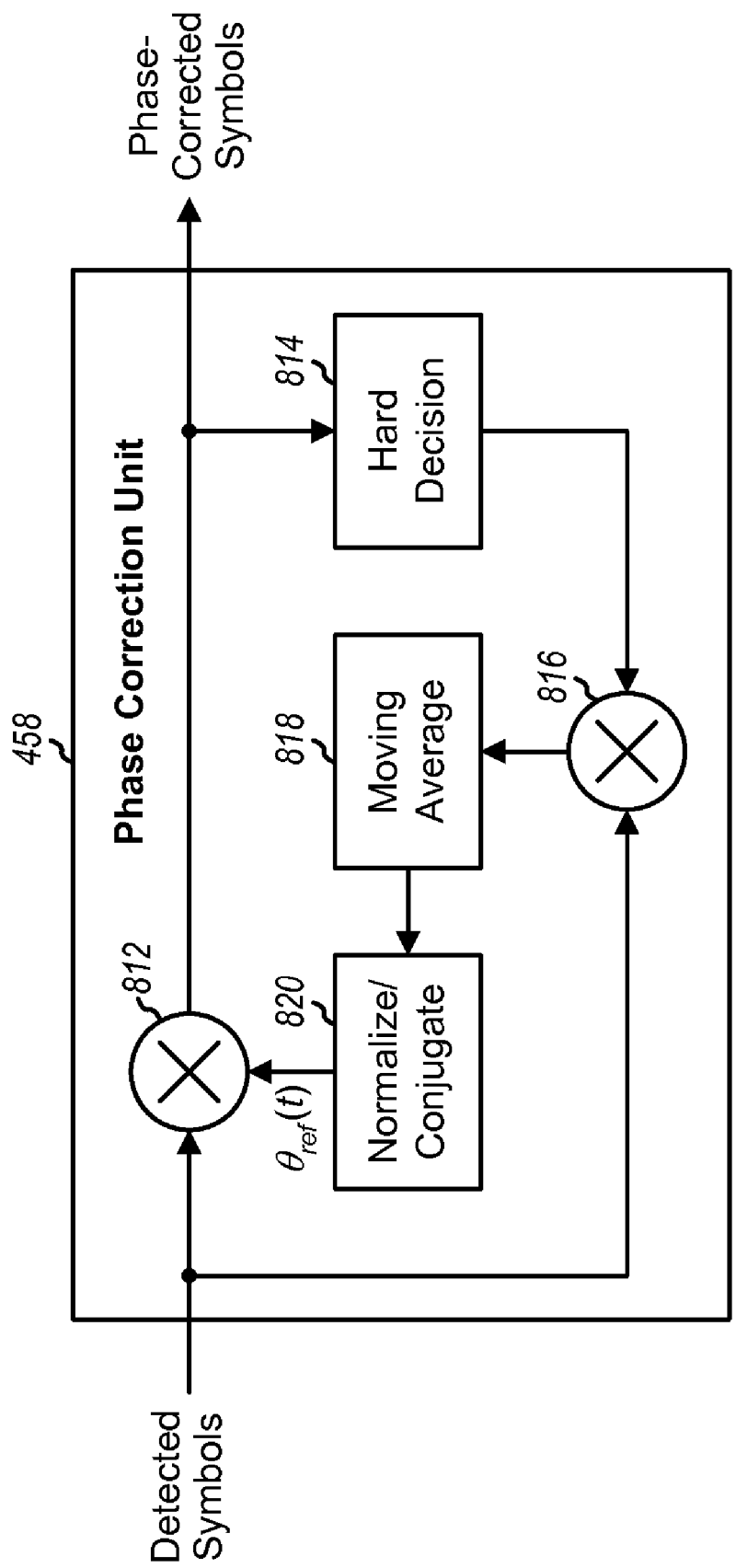
FIG. 8 shows a phase correction unit.

FIG. 8 shows a block diagram of an embodiment of phase correction unit 458. Within unit 458, a multiplier 812 rotates each detected symbol from rake receiver 456 by a phase reference $\theta_{ref}(t)$ and provides a corresponding phase-corrected symbol. A unit 814 generates a hard decision (e.g., +1 or −1) for each phase-corrected symbol. A multiplier 816 multiplies each detected symbol with the corresponding hard decision and provides a product for that detected symbol. A unit 818 computes a moving average of the products from multiplier 816 and provides an averaged product. For each symbol period, a unit 820 normalizes and conjugates the averaged product and provides the phase reference $\theta_{ref}(t)$ for the detected symbol for that symbol period t. The phase reference may thus be derived by averaging over a window of detected symbols. The averaging may be designed to account for the fact that the phase information from the known pilot symbols in the SYNC field is more reliable but may not be current whereas the phase information for the detected symbols may not be as reliable but is more current.

Referring back to FIG. 4, a demodulator 460 performs coherent demodulation of the phase-corrected symbols. For BPSK, demodulator 460 may provide the real component of each phase-corrected symbol a demodulated symbol, which is an estimate of the data symbol sent by transmitting station 110. For other modulation schemes, demodulator 460 may provide a modulation symbol that is most likely to have been sent for each phase-corrected symbol as a demodulated symbol.

A deinterleaver 462 deinterleaves the demodulated symbols in a manner complementary to the interleaving performed by interleaver 256 in FIG. 2. FEC decoder 464 decodes the deinterleaved symbols in a manner complementary to the encoding performed by FEC encoder 252 in FIG. 2 and provides output data. A multiplexer 470 receives the output data from DSSS receive processors 440 and 450, provides the output data from DSSS receive processor 440 if the received PPDU is for 802.11b/g, and provides the output data from DSSS receive processor 450 if the received PPDU is for the range extension mode.

FIG. 4 shows a specific embodiment of receive processor 160 for 802.11b/g and the range extension mode. Receive processor 160 may also be implemented with other designs, and this is within the scope of the invention. In general, the processing by DSSS receive processor 440 is complementary to the processing by DSSS transmit processor 240 at transmitting station 110, and the processing by DSSS receive processor 450 is complementary to the processing by DSSS transmit processor 250. FIG. 4 shows exemplary designs of DSSS receive processors 440 and 450, which may include other and/or different processing units not shown in FIG. 4.

Figures 9, 10:
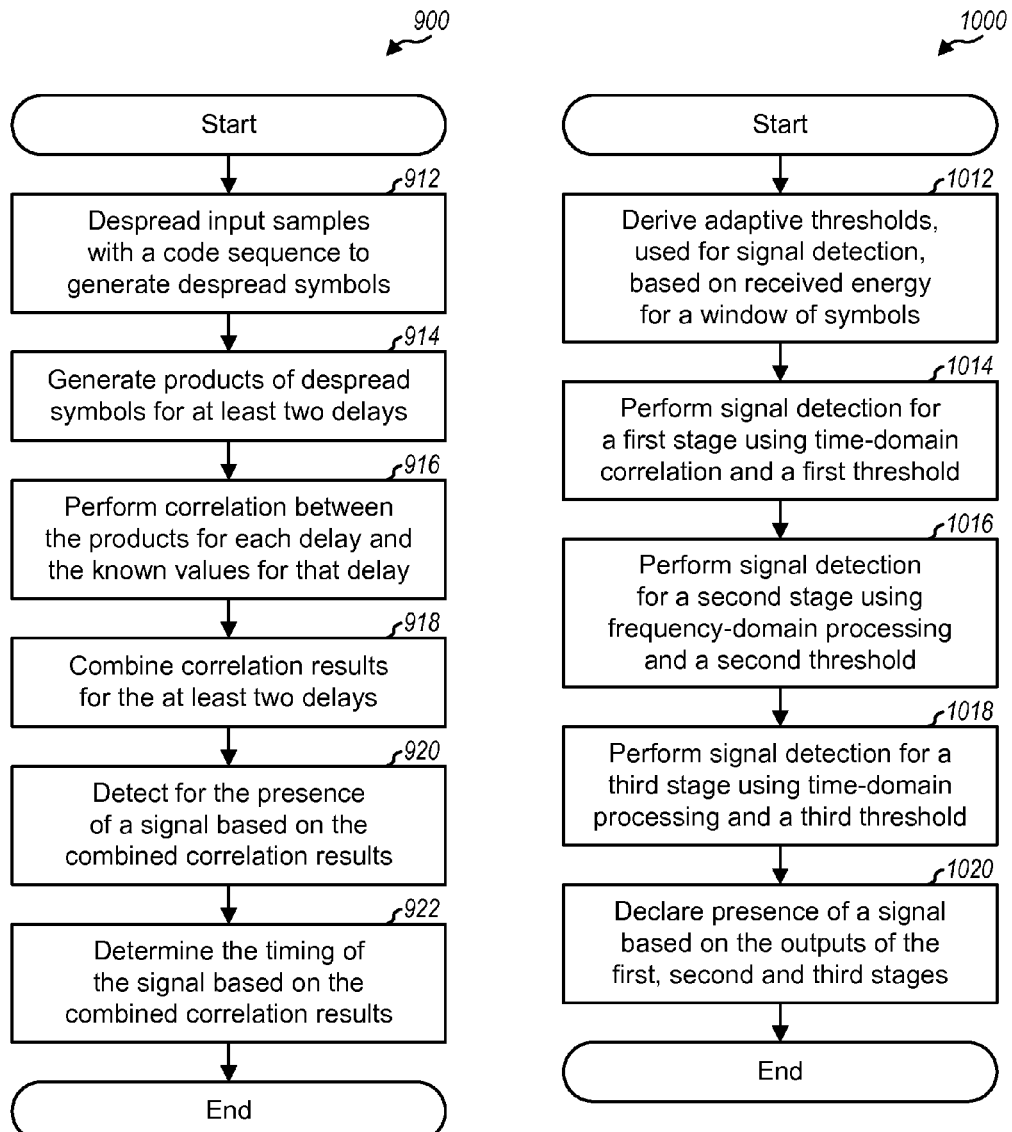
FIG. 9 shows a process for performing signal detection for the first stage.
FIG. 10 shows a process for performing signal detection with multiple stages.

FIG. 9 shows a process 900 for performing signal detection for the first stage. Input samples are despread with a code sequence to generate despread symbols, e.g., at chip rate (block 912). Products of despread symbols are generated for at least two different delays (block 914). Each product is generated based on a despread symbol and a complex conjugate of another despread symbol that is at least one symbol period earlier. For example, 1-symbol delayed products and 2-symbol delayed products may be generated as shown in FIG. 5, with each 1-symbol delayed product being generated with two despread symbols that are separated by one symbol period, and each 2-symbol delayed product being generated with two despread symbols that are separated by two symbol periods.

Correlation between the products for each delay and the known values for that delay is then performed (block 916). The known values may be products of pilot bits, as shown in FIG. 5. Adjacent products for each delay may be summed prior to performing correlation to account for delay spread in the wireless channel, as also shown in FIG. 5. Correlation results for all of the delays are combined (block 918). The correlation results for the 2-symbol delay may be rotated by multiple hypothesized phases and combined with the corresponding correlation results for the 1-symbol delay, and the combined correlation results with the largest magnitude among the multiple hypothesized phases may be selected, as shown in FIG. 5. Alternatively, the correlation results for the different delays may be non-coherently combined.

The presence of a signal/transmission is then detected based on the combined correlation results, e.g., by comparing the combined correlation results against an adaptive threshold $Z_{th}$ that is a function of the received energy (block 920). The timing of the signal is also determined based on the combined correlation results, e.g., by detecting for a peak in the combined correlation results (block 922).

FIG. 10 shows a process 1000 for performing signal detection with multiple (e.g., three) stages using different types of signal processing. Adaptive thresholds used for signal detection by the stages are derived based on the received energy for a window of symbols (block 1012). Signal detection for the first stage is performed using time-domain correlation and a first threshold (block 1014). For the first stage, products of symbols may be generated for at least one delay, correlation between the products for each delay and known values for that delay may be performed, and detection may be declared based on the correlation results for the at least one delay and the first threshold. Signal detection for a second stage is performed using frequency-domain processing and a second threshold (block 1016). For the second stage, energies for multiple frequency bins may be determined, and detection may be declared based on the energies for these frequency bins and the second threshold. Signal detection for a third stage is performed using time-domain processing and a third threshold (block 1018). Multiple channel taps for a channel impulse response estimate may be derived, and detection may be declared based on the channel taps and the third threshold. The presence of a signal is declared based on the outputs of the first, second and third stages (block 1020).

Figure 11:
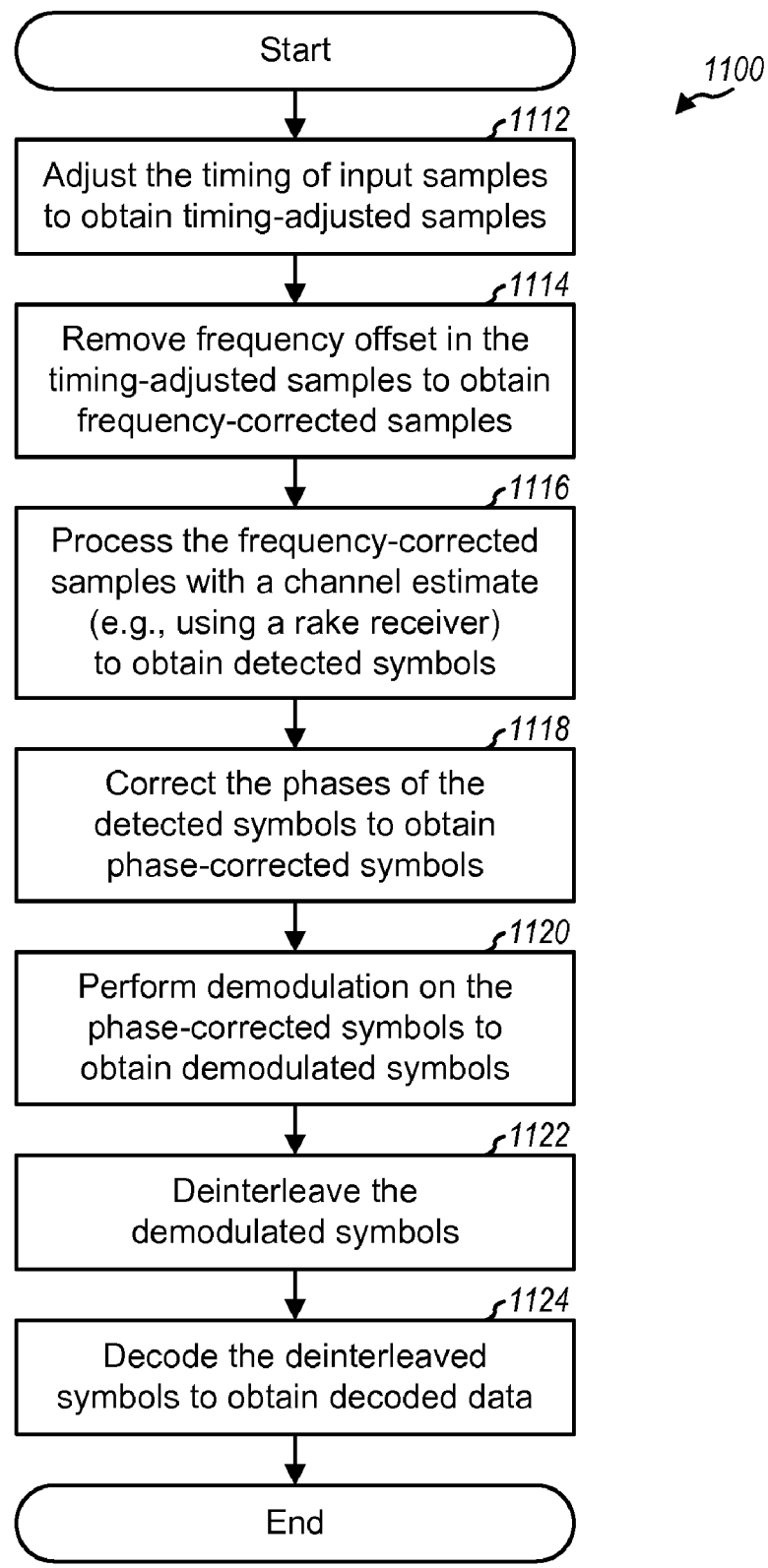
FIG. 11 shows a process for receiving a transmission.

FIG. 11 shows a process 1100 for receiving a transmission or PPDU. The timing of input samples is adjusted to obtain timing-adjusted samples (block 1112). The timing adjustment may be performed with a polyphase filter and/or based on a frequency offset determined during frequency acquisition. The frequency offset in the timing-adjusted samples is removed to obtain frequency-corrected samples (block 1114). The frequency-corrected samples are processed with a channel estimate (e.g., using a rake receiver) to obtain detected symbols (block 1116). The phases of the detected symbols are corrected to obtain phase-corrected symbols (block 1118). For the phase correction, a phase reference may be derived based on the detected symbols, and the phases of the detected symbols may be corrected based on the phase reference. Demodulation is performed on the phase-corrected symbols to obtain demodulated symbols (block 1120). The demodulated symbols are deinterleaved (block 1122), and the deinterleaved symbols are decoded to obtain decoded data (block 1124).

The processes depicted and described with respect to FIGS. 9-11 may be implemented as functions performed by processor 160. The individual blocks may comprise instructions that are performed by processor 160.

The techniques described herein may be implemented by various means. For example, these techniques may be implemented in hardware, firmware, software, or a combination thereof. For a hardware implementation, the processing units used to perform signal detection, acquisition, and demodulation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 182 in FIG. 1) and executed by a processor (e.g., processor 160 and/or processor 180). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a processor operative to perform signal detection using time-domain correlation for a first stage, to perform signal detection using frequency-domain processing for a second stage, and to declare detection of a signal based on outputs of the first and second stages; and
a memory coupled to the processor, wherein for the second stage the processor is operative to determine energies for a plurality of frequency bins and to declare detection by the second stage based on the energies for the plurality of frequency bins, wherein the processor is operative to perform signal detection using time-domain processing for a third stage and to declare the presence of the signal based on outputs of the first, second, and third stages, and wherein for the third stage the processor is operative to derive a plurality of channel taps for a channel impulse response estimate and to declare detection by the third stage based on the plurality of channel taps.

2. An apparatus comprising:
a processor operative to perform signal detection using time-domain correlation for a first stage, to perform signal detection using frequency-domain processing for a second stage, and to declare detection of a signal based on outputs of the first and second stages; and
a memory coupled to the processor, wherein for the second stage the processor is operative to determine energies for a plurality of frequency bins and to declare detection by the second stage based on the energies for the plurality of frequency bins,
wherein the processor is operative to perform signal detection using time-domain processing for a third stage and to declare the presence of the signal based on outputs of the first, second, and third stages.

3. An apparatus comprising:
a processor operative to perform signal detection using time-domain correlation for a first stage, to perform signal detection using frequency-domain processing for a second stage, and to declare detection of a signal based on outputs of the first and second stages; and
a memory coupled to the processor, wherein the processor is operative to compute received energy for at least two symbols, to derive a first threshold for the first stage and a second threshold for the second stage based on the received energy, to perform the signal detection for the first stage with the first threshold, and to perform the signal detection for the second stage with the second threshold.

4. A method of performing signal detection, comprising:
performing signal detection using time-domain correlation for a first stage;
performing signal detection using frequency-domain processing for a second stage;
declaring the presence of a signal based on outputs of the first and second stages;
computing received energy for at least two symbols; and
deriving a first threshold for the first stage and a second threshold for the second stage based on the received energy, wherein the signal detection for the first stage is performed with the first threshold, and wherein the signal detection for the second stage is performed with the second threshold.

5. The method of claim 4, further comprising: performing signal detection using time-domain processing for a third stage, and wherein the presence of the signal is declared based on outputs of the first, second, and third stages.

6. An apparatus comprising:
means for performing signal detection using time-domain correlation for a first stage;
means for performing signal detection using frequency-domain processing for a second stage;
means for declaring the presence of a signal based on outputs of the first and second stages;
means for computing received energy for at least two symbols; and
means for deriving a first threshold for the first stage and a second threshold for the second stage based on the received energy, wherein the signal detection for the first stage is performed with the first threshold, and wherein the signal detection for the second stage is performed with the second threshold.

7. The apparatus of claim 6, further comprising: means for performing signal detection using time-domain processing for a third stage, and wherein the presence of the signal is declared based on outputs of the first, second, and third stages.

8. An apparatus used when receiving a transmission comprising a memory unit having instructions stored thereon, the instructions being executable by one or more processors and the instructions comprising:
instructions for performing signal detection using time-domain correlation for a first stage;
instructions for performing signal detection using frequency-domain processing for a second stage;

instructions for declaring the presence of a signal based on outputs of the first and second stages;
instructions for computing received energy for at least two symbols; and
instructions for deriving a first threshold for the first stage and a second threshold for the second stage based on the received energy, wherein the signal detection for the first stage is performed with the first threshold, and wherein the signal detection for the second stage is performed with the second threshold.

9. The apparatus of claim 8, further comprising: instructions for performing signal detection using time-domain processing for a third stage, and wherein the presence of the signal is declared based on outputs of the first, second and third stages.

* * * * *